(12) United States Patent
Jiang et al.

(10) Patent No.: US 11,284,224 B2
(45) Date of Patent: Mar. 22, 2022

(54) GROUP COMMUNICATION APPARATUS AND METHOD AND COMMUNICATION SYSTEM

(71) Applicant: FUJITSU LIMITED, Kawasaki (JP)

(72) Inventors: Qinyan Jiang, Beijing (CN); Hua Zhou, Beijing (CN); Wei Xi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/239,034

(22) Filed: Jan. 3, 2019

(65) Prior Publication Data

US 2019/0141487 A1    May 9, 2019

Related U.S. Application Data

(63) Continuation of application No. PCT/CN2016/090016, filed on Jul. 14, 2016.

(51) Int. Cl.
*H04W 4/08* (2009.01)
*H04W 72/04* (2009.01)
(Continued)

(52) U.S. Cl.
CPC ............ *H04W 4/08* (2013.01); *H04W 48/16* (2013.01); *H04W 72/0406* (2013.01); *H04L 25/03866* (2013.01); *H04W 4/40* (2018.02)

(58) Field of Classification Search
None
See application file for complete search history.

(56) References Cited

U.S. PATENT DOCUMENTS

| 2004/0114594 A1 | 6/2004 | Hoffmann |
| 2010/0034161 A1 | 2/2010 | Luo et al. |

(Continued)

FOREIGN PATENT DOCUMENTS

| CN | 101394222 A | 3/2009 |
| CN | 101534174 A | 9/2009 |

(Continued)

OTHER PUBLICATIONS

International Search Report issued by the State Intellectual Property Office of the P.R. China for corresponding International Patent Application No. PCT/CN2016/090016, dated Jan. 26, 2017, with an English translation.

(Continued)

*Primary Examiner* — Joseph E Avellino
*Assistant Examiner* — The Hy Nguyen
(74) *Attorney, Agent, or Firm* — Myers Wolin, LLC

(57) ABSTRACT

This disclosure provides a group communication apparatus and method and a communication system. The group communication method includes: scrambling data information of a message by using corresponding scrambling information according to a message type and/or a message transmission range; wherein, different message types and/or message transmission ranges correspond to different scrambling information. Therefore, internal members or peripheral devices of a group may selectively receive messages of different types or different target ranges. Hence, not only messages may be ensured to be accurately received by corresponding receivers, but also security of internal message may be improved.

13 Claims, 9 Drawing Sheets

(51) Int. Cl.
*H04L 25/03* (2006.01)
*H04W 48/16* (2009.01)
*H04W 4/40* (2018.01)

(56) References Cited

U.S. PATENT DOCUMENTS

| | | | |
|---|---|---|---|
| 2011/0149859 A1* | 6/2011 | Sung | H04W 76/15 370/328 |
| 2014/0003262 A1* | 1/2014 | He | H04W 72/0446 370/252 |
| 2014/0233475 A1* | 8/2014 | Ro | H04W 76/14 370/329 |
| 2016/0174194 A1 | 6/2016 | Suzuki et al. | |
| 2016/0183276 A1 | 6/2016 | Marinier et al. | |
| 2016/0345375 A1* | 11/2016 | Wang | H04L 1/0041 |
| 2018/0139640 A1* | 5/2018 | Chae | H04L 25/0204 |
| 2018/0160347 A1* | 6/2018 | Chen | H04W 28/26 |
| 2018/0317198 A1* | 11/2018 | Lee | H04L 5/0007 |
| 2018/0338319 A1* | 11/2018 | Kim | H04W 72/1278 |

FOREIGN PATENT DOCUMENTS

| | | |
|---|---|---|
| CN | 102113403 A | 6/2011 |
| CN | 102892084 A | 1/2013 |
| CN | 103107867 A | 5/2013 |
| CN | 103856903 A | 6/2014 |
| CN | 105409287 A | 3/2016 |
| EP | 2 903 312 A1 | 8/2015 |
| EP | 2 986 041 A1 | 2/2016 |
| WO | 2016/052979 A1 | 4/2016 |

OTHER PUBLICATIONS

Written Opinion of the International Searching Authority issued by the State Intellectual Property Office of the P.R. China for corresponding International Patent Application No. PCT/CN2016/090016, dated Jan. 26, 2017, with an English translation.
First Notification of Office Action and Search Report issued by the China National Intellectual Property Administration for corresponding Chinese Patent Application No. 201680087025.7, dated Nov. 2, 2021, with an English translation.

* cited by examiner

GROUP COMMUNICATION APPARATUS AND METHOD AND COMMUNICATION SYSTEM

CROSS REFERENCE TO RELATED APPLICATIONS

This application is a continuation application of International Application PCT/CN2016/090016 filed on Jul. 14, 2016, the entire contents of which are incorporated herein by reference.

TECHNICAL FIELD

This disclosure relates to the field of communication technologies, and in particular to a group communication apparatus and method and a communication system.

BACKGROUND

With the wide spread and globalization of communication technologies, applications based on communication technologies are becoming more and more widely used. Among them, an intelligent transportation system has become a very popular application trend. In the recent research work of the 3rd Generation Partnership Project (3GPP), Vehicle-to-everything (V2X) communication was established as an important research and became one of the current hot research topics of 3GPP.

In the V2X communication, a vehicle may indicate a resource location, a modulation and demodulation mode, and a target receiver, etc., of data information of a message, via control information of the message; the control information is, for example, sidelink control information (SCI) carried by a physical side link control channel (PSCCH). After receiving the SCI, the vehicle may successfully receive the data information according to information contained in the SCI.

In the research of 5th-generation (5G) communication technology, 3GPP proposed a typical autonomous driving scenario for vehicle communication, that is, multiple vehicles may form a fleet, and the first vehicle manages and controls the entire fleet to travel forward, thereby reducing vehicle spacing and saving energies.

It should be noted that the above description of the background is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that in the above autonomous driving scenario, vehicles in the fleet need not only to exchange such internal information or private information as a travelling route of the fleet, etc. with other vehicles in the fleet, but also to exchange such information as a state of the fleet, etc. with vehicles or devices outside of the fleet.

That is, on one hand, internal members or peripheral devices of a group (or may be referred to as a queue) need to selectively receive messages of different target ranges; and on the other hand, in order to avoid potential risk to security, it should be ensured that internal information or private information of the group can only be received by the internal members of the group. However, the demands of the above group communication cannot be satisfied by existing inter-device direct communication technologies.

Embodiments of this disclosure provide a group communication apparatus and method and a communication system, in which internal members or peripheral devices of a group may selectively receive messages of different types or different target ranges.

According to a first aspect of the embodiments of this disclosure, there is provided a group communication method, applicable to a first user equipment, the group communication method including:

scrambling data information of a message by using corresponding scrambling information according to a message type and/or a message transmission range; wherein, different message types and/or message transmission ranges correspond to different scrambling information; and transmitting the scrambled data information to a second user equipment.

According to a second aspect of the embodiments of this disclosure, there is provided a group communication apparatus, configured in a first user equipment (UE), the group communication apparatus comprising:

a data scrambling unit configured to scramble data information of a message by using corresponding scrambling information according to a message type and/or a message transmission range; wherein, different message types and/or message transmission ranges correspond to different scrambling information; and a data transmitting unit configured to transmit the scrambled data information to a second UE.

According to a third aspect of the embodiments of this disclosure, there is provided a group communication method, applicable to a second user equipment, the group communication method including:

descrambling data information of a message by using corresponding descrambling information according to a message type and/or a message transmission range; wherein, different message types and/or message transmission ranges correspond to different descrambling information; and obtaining the data information of the message in case of successful descrambling.

According to a fourth aspect of the embodiments of this disclosure, there is provided a group communication apparatus, configured in a second UE, the group communication apparatus including:

a data descrambling unit configured to descramble data information of a message transmitted by a first UE by using corresponding descrambling information according to a message type and/or a message transmission range; wherein, different message types and/or message transmission ranges correspond to different descrambling information; and a data receiving unit configured to obtain the data information of the message in case of successful descrambling.

According to a fifth aspect of the embodiments of this disclosure, there is provided a user equipment, configured with the group communication apparatus as described in the second aspect.

According to a sixth aspect of the embodiments of this disclosure, there is provided a user equipment, configured with the group communication apparatus as described in the fourth aspect.

According to a seventh aspect of the embodiments of this disclosure, there is provided a communication system, including:

a first UE configured to scramble data information of a message by using corresponding scrambling information according to a message type and/or a message transmission range;

wherein, different message types and/or message transmission ranges correspond to different scrambling information; and transmit the scrambled data information; and a second UE configured to descramble data information of a message by using corresponding descrambling information according to a message type and/or a message transmission range; wherein, different message types and/or message transmission ranges correspond to different descrambling information; and obtain the data information of the message in case of successful descrambling.

An advantage of the embodiments of this disclosure exists in that the data information are scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a node B, or an evolved node B (eNB), etc., and may include some or all of their functions. In this disclosure, the term "base station" shall be used. Each base station may provide communication coverage for a specific geographical area. And a term "cell" may refer to a base station and/or its coverage area, which is dependent on a context of the term.

In this disclosure, a mobile station or device may be referred to as "a user equipment (UE)". The UE may be fixed or mobile, and may also be referred to as a mobile station, a terminal, an access terminal (AT), a subscriber unit, or a station, etc. The UE may be a cellular phone, a personal digital assistant (PDA), a wireless modem, a wireless communication device, a hand-held device, a lap-top, or a cordless telephone, etc.

In this disclosure, a group may be referred to as a queue, which may be a vehicle fleet in a V2X scenario, or may be a set of other devices in other scenarios. And the group communication of the embodiments of this disclosure shall be described below by taking a vehicle fleet as an example.

Figure 1:
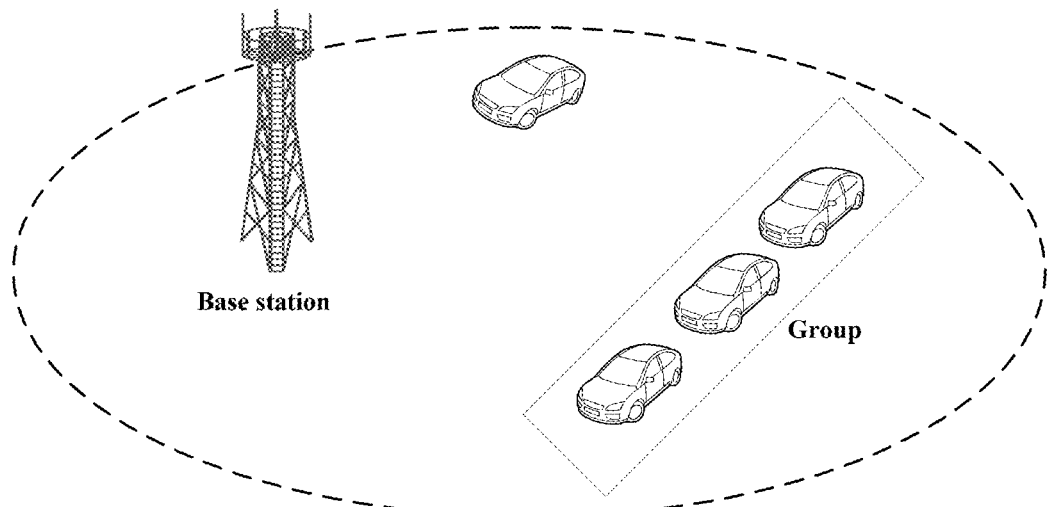
FIG. 1 is a schematic diagram of a scenario of an embodiment of this disclosure.

FIG. 1 is a schematic diagram of a scenario of an embodiment of this disclosure. As shown in FIG. 1, multiple vehicles (which may be deemed as UEs) may form a group, in which communication may be performed between members in the group. And furthermore, the vehicles may be located within a coverage range of a base station, and the base station may communicate with the UEs. It should be noted that this disclosure may also be applicable to a case where none of the UEs are located within a coverage range of a base station, or may be applicable to a case where a part of the UEs are located within a coverage range of a base station.

In a group, a group management or control function may be concentrated in a device, for example, internal members of the group may be divided into a primary UE (such as a header in a V2X scenario) and secondary UEs (such as other vehicles in the V2X scenario); and furthermore, the group management or control function may be distributed in multiple or all members in the group. However, this disclosure is not limited thereto, and a particular implementation of a group may be determined according to an actual situation.

Embodiment 1

Figure 2:
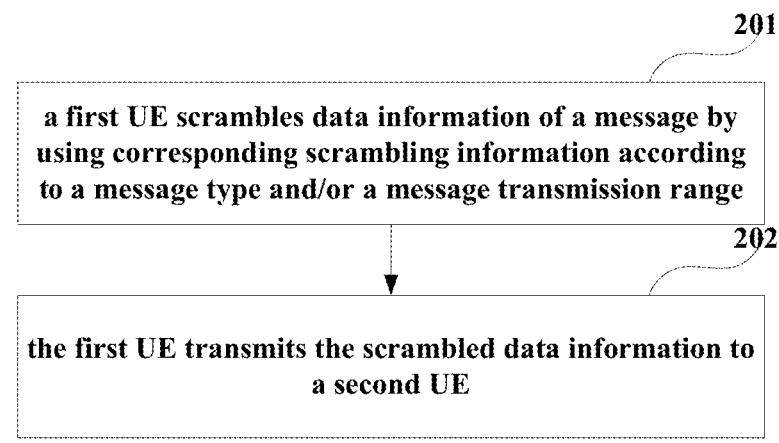
FIG. 2 is a flowchart of the group communication method of Embodiment 1 of this disclosure.

These embodiments of this disclosure provide a group communication method, which shall be described from a transmitting device (a first UE). FIG. 2 is a flowchart of the group communication method of the embodiment of this disclosure. As shown in FIG. 2, the group communication method includes:

Block 201: the first UE scrambles data information of a message by using corresponding scrambling information according to a message type and/or a message transmission range; different message types and/or message transmission ranges correspond to different scrambling information; and Block 202: the first UE transmits the scrambled data information to a second user equipment.

In an embodiment, the first UE is a transmitting device of a message, and the second UE is a receiving device of the message. The first UE and the second UE may be members of the same group, and the message is an intra-group message. Alternatively, the first UE and the second UE may not be members of the same group, and the message may be a non-intra-group message (such as an out-of-group message).

For example, the non-intra-group message may be an out-of-group message transmitted only to external members of the group, or may be a message transmitted to both internal members of the group and external members of the group (for example, it may be referred to as a general message), or may be a message that is transmitted to internal members of the group and received by those not excluding an external member of the group; however, this disclosure is not limited thereto.

In an embodiment, the message may be an intra-group message or a non-intra-group message (such as an out-of-group message), and the data information of the message may be transmitted via a data channel. And the message may also be a group discovery message, and the data information of the group discovery message may be transmitted via a discovery channel, such as a physical sidelink discovery channel (PSDCH).

In an embodiment, there exists a correspondence between the message type (and/or message transmission range) and the scrambling information, which may be a one-to-one correspondence, for example, an internal message corresponds to a scrambling sequence 1, an external message corresponds to a scrambling sequence 2, and a general message corresponds to a scrambling sequence 3, etc., or it may be a many-to-one correspondence, for example, an internal message corresponds to a scrambling sequence 1, both an external message and a general message correspond to a scrambling sequence 2, or the like; or it may also be a one-to-many correspondence, for example, an internal message corresponds to a scrambling sequence 1 and a scrambling sequence 2, an external message corresponds to a scrambling sequence 3, or the like.

However, this disclosure is not limited thereto. It is only required that there exist different message types and/or message transmission range corresponding to different scrambling information. And furthermore, the correspondence between the message type (and/or message transmission range) and the scrambling information may be predefined or may be dynamically adjusted, as long as an agreement is made between the transmitting device and receiving device of the message.

Figure 3:
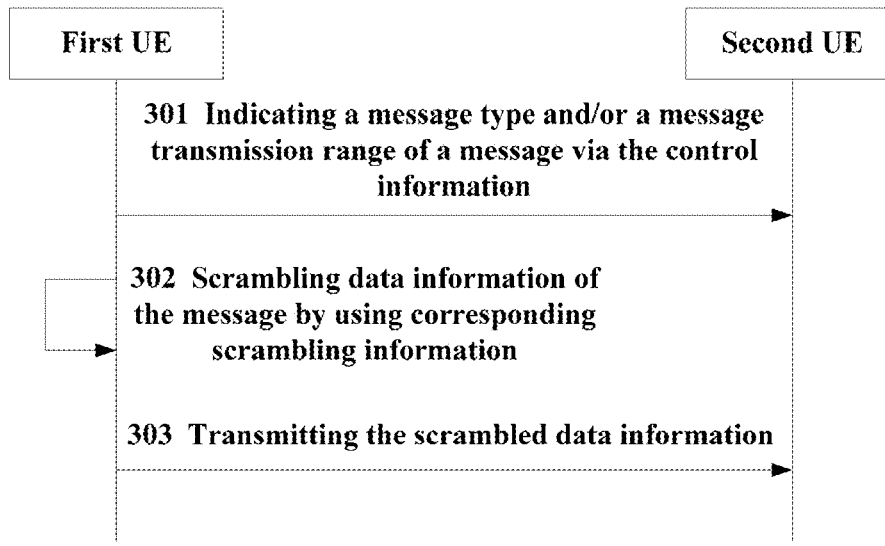
FIG. 3 is another flowchart of the group communication method of Embodiment 1 of this disclosure.

FIG. 3 is another schematic diagram of the group communication method of the embodiment of this disclosure, in which a case where control information of a message is used is shown. As shown in FIG. 3, the group communication method may include:

301: the first UE indicates a message type and/or a message transmission range to the second UE via the control information;

302: the first UE scrambles data information of the message according to the message type and/or the message transmission range; different message types and/or the message transmission ranges correspond to different scrambling information; and 303: the first UE transmits the scrambled data information to the second UE.

In an embodiment, the control information may be transmitted a control channel (that is, the control information is an SCI), or may be transmitted via a synchronization signal and/or a broadcast channel (e.g. a physical sidelink broadcast channel (PSBCH)). And the data information may be transmitted via a data channel (e.g. a physical sidelink shared channel (PSSCH)) (such as dynamically scheduling one or more time-frequency resources, or occupying periodic/semi-periodic fixed one or more time-frequency resources). However, this disclosure is not limited thereto, and a particular transmission mode may be selected according to an actual situation.

Following description shall be given by taking that a message type and/or a message transmission range of a message is indicated via an SCI of a control channel in a V2X scenario as an example.

Figure 4:
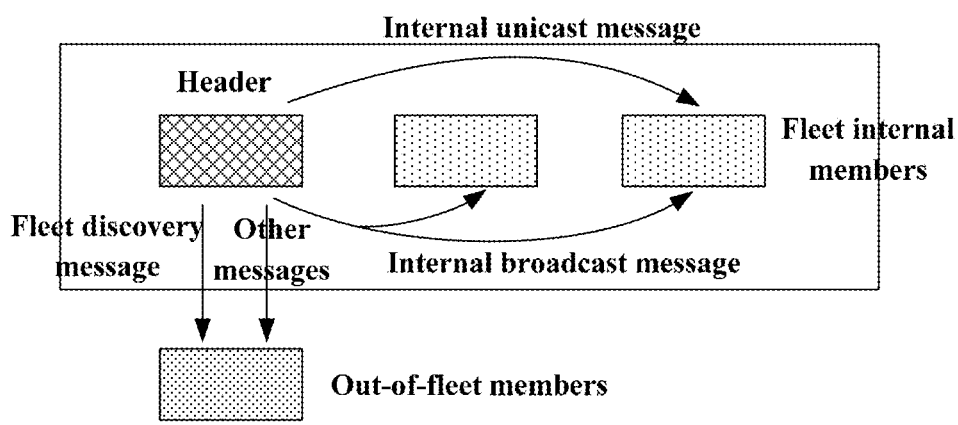
FIG. 4 is a schematic diagram of a fleet message type of Embodiment 1 of this disclosure.

FIG. 4 is a schematic diagram of a fleet message type of the embodiment of this disclosure. As shown in FIG. 4, a header may transmit internal messages (including internal unicast messages and internal broadcast messages) to internal members of the fleet. And furthermore, it may transmit external messages to external members of the fleet, and may also transmit other messages to both the internal and external members.

For example, the control information may include one or more pieces of the following information: indication information indicating a type of the message, identification information of the group, and identification information of the UE. Taking the SCI as an example, the SCI may indicate different message types and/or message transmission ranges, such as indicating whether the message is a fleet internal message and/or a fleet discovery message.

Table 1 is an example of an indication mode of the SCI message type.

TABLE 1

|  | Own fleet ID | Internal vehicle ID |
| --- | --- | --- |
| 1 (indicated as an internal message) | Internal broadcast message | Internal unicast message |
| 0 (indicated as a fleet discovery message) | Fleet discovery message |  |

As shown in table 1, one bit may be used in the SCI to indicate whether the message is an internal message or an external message (e.g. a fleet discovery message), and a number of bits may be used to indicate the own fleet ID or internal vehicle ID. For example, when the message is an internal broadcast message, "internal message" is indicated in the SCI and an own fleet ID is included in the SCI; when the message is an internal unicast message, "internal message" is indicated in the SCI and an internal vehicle ID is included; and when the message is a fleet discovery message, "fleet discovery message" is indicated in the SCI and the own fleet ID is included in the SCI.

It should be noted that Table 1 only schematically shows an example of the control information; however, this disclosure is not limited thereto. For example, an identifier 1 may be used to indicate the internal broadcast message, an identifier 2 is used to indicate the internal unicast message, and an identifier 3 is used to indicate the fleet discovery message, and so on. And a particular form of the control information may be determined according to an actual situation.

The above description is given by taking the condition that the header transmits a message as an example. Other members in the group may also transmit the message in a similar manner. For example, internal messages are transmitted between internal members of the group, or external messages are transmitted by other members in the group to the outside of the group.

In an embodiment, if the fleet discovery message is periodically transmitted by using one or more fixed resources, the fleet discovery message may not be indicated by using an SCI, and may be indicated by using a synchronization signal and/or broadcast information (such as an MIB-SL, carried by a physical sidelink broadcast channel (PSBCH)).

In addition, if the fleet discovery message is carried by a discovery channel, the control information may not be transmitted for indication. Reference may be made to the relevant art for particular contents of the signal or message, and reference may be made to a group discovery and selection incorporation process in Embodiment 2 for a particular method.

In an embodiment, the transmitting device may select corresponding scrambling information (such as a scrambling sequence or a scrambling ID) according to the message type and/or the message transmission range to scramble the data information. It should be noted that the above concept or contents regarding the signal or channel are not limited to the contents in a long-term evolution (LTE) system or an LTE-A system, which may also be, for example, an enhanced signal or channel.

In an embodiment, if the message is an intra-group message, the data information of the message may be scrambled by using a group-specific sequence. The group-specific sequence may be generated by the UE and reported to the base station, or may be generated or pre-configured by the base station for the group based on the reported information of the UE; and the group-specific sequence may be notified by the base station to the internal members of the group. In addition, the group-specific sequence may be updated periodically, or may be updated when a UE joins in the group, or may be updated when a UE leaves the group.

For example, when a vehicle transmits an intra-fleet message, the data information may be scrambled by using a fleet-specific scrambling sequence that is known in advance to vehicles within the fleet. The fleet-specific scrambling sequence may be generated by the header and then reported to the base station, or the base station may assign the fleet-specific scrambling sequences to the group members. The fleet-specific scrambling sequence may be updated periodically, or may be updated when a vehicle leaves the fleet. And the base station informs a vehicle of a current fleet-specific scrambling sequence when the vehicle newly joins in the fleet.

In another embodiment, if the message is a non-intra-group message, the data information may be scrambled by using identification information contained in the control information, or the data information may be scrambled by using a scrambling sequence generated according to the identification information.

For example, when the vehicle transmits a non-intra-fleet message, the data information may be scrambled by using an ID included in the SCI or a sequence generated based on the ID.

In another embodiment, if the message is a group discovery message (for example, the data information is transmitted via a discovery channel and the control information is not used), the data information may be scrambled by using a predetermined scrambling sequence; or, in a case where the identification information is not contained in the control information, the data information may also be scrambled by using a predetermined scrambling sequence. The predetermined scrambling sequence may be a sequence specified in a standard, and may also be known to the UEs, and an agreement may be made in advance between the transmitting device and the receiving device of the message.

Following description shall be given by using the SCI and taking a vehicle fleet as an example.

Figure 5:
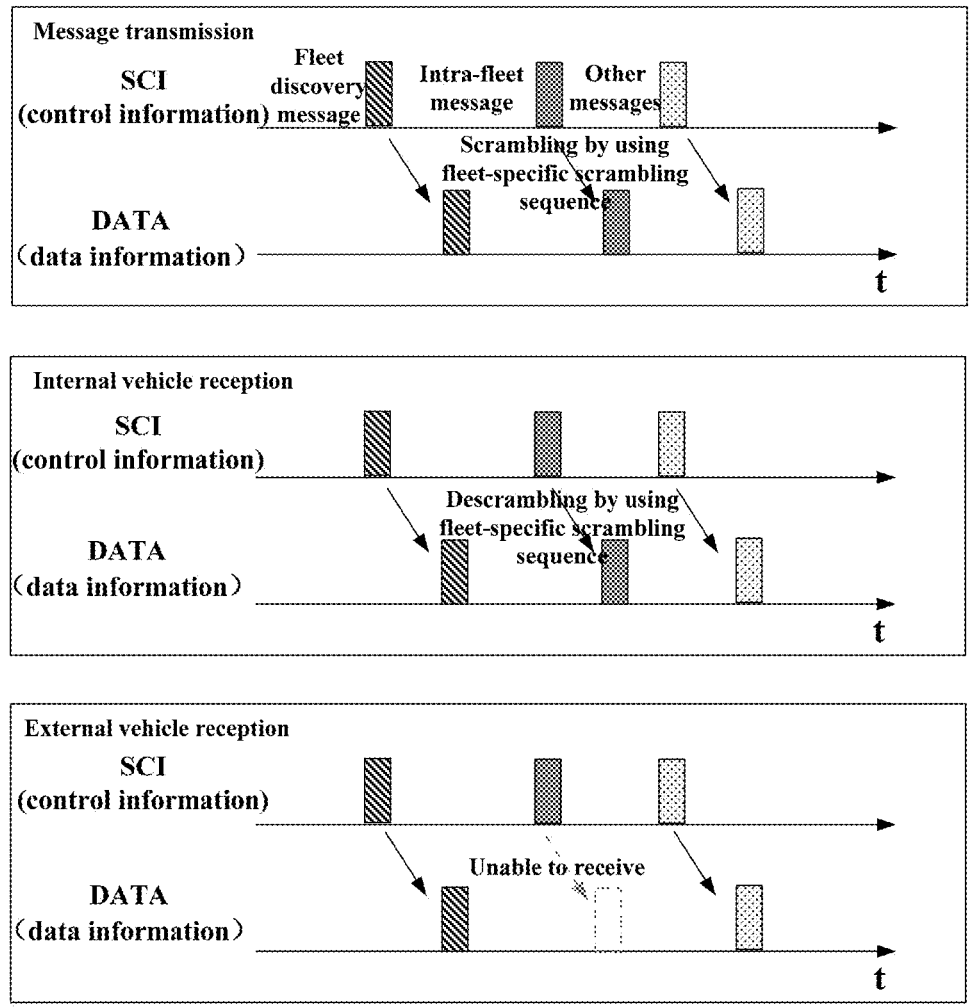
FIG. 5 is a schematic diagram of fleet message transmission of Embodiment 1 of this disclosure.

FIG. 5 is a schematic diagram of fleet message transmission of the embodiment of this disclosure. As shown in FIG. 5, in transmitting an intra-fleet message, the data information may be scrambled by using a fleet-specific scrambling sequence. And in transmitting a fleet discovery message or other messages, the data information may be scrambled by using an ID contained in the SCI or a sequence generated based on the ID.

At the receiving device, the vehicle may determine the message type and/or transmission range of the message according to information contained in the SCI (such as whether it is an intra-fleet message or an out-of-fleet message, or whether it is a fleet discovery message).

If the message is an intra-fleet message, the internal vehicle may utilize a fleet-specific descrambling sequence (such as that identical to the fleet-specific scrambling sequence) to receive the data information. Furthermore, when the message is an internal unicast message, only the vehicle indicated by the ID contained in the SCI needs to receive the data information. And for an external vehicle, since the fleet-specific descrambling sequence is not known to it, the data information cannot be descrambled, and thus, subsequent data information is not received.

If the message is a non-intra-fleet message (such as the fleet discovery message or other messages shown in FIG. 5), all vehicles may descramble the data information according to the information contained in the SCI (such as the own fleet ID), and may select whether to receive the message according to the information contained in the SCI (e.g. a target receiver ID/target receiving group ID, a message type, etc.).

In particular, when the SCI does not perform information type indication, such as the indication in the manner as described above, the vehicle may regard it as default that the message is a non-internal message and attempt to receive the message; and the intra-fleet vehicle may attempt to further receive the message by using the fleet-specific descrambling sequence.

It can be seen from the above embodiments that the data information is scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

Embodiment 2

These embodiments of this disclosure further describe the group discovery message on the basis of Embodiment 1, with contents identical to those in Embodiment 1 being not going to be described herein any further. In these embodiments, the first UE and the second UE are not UEs in the same group, that is, the second UE is a UE outside of the group where the first UE is located.

Figure 6:
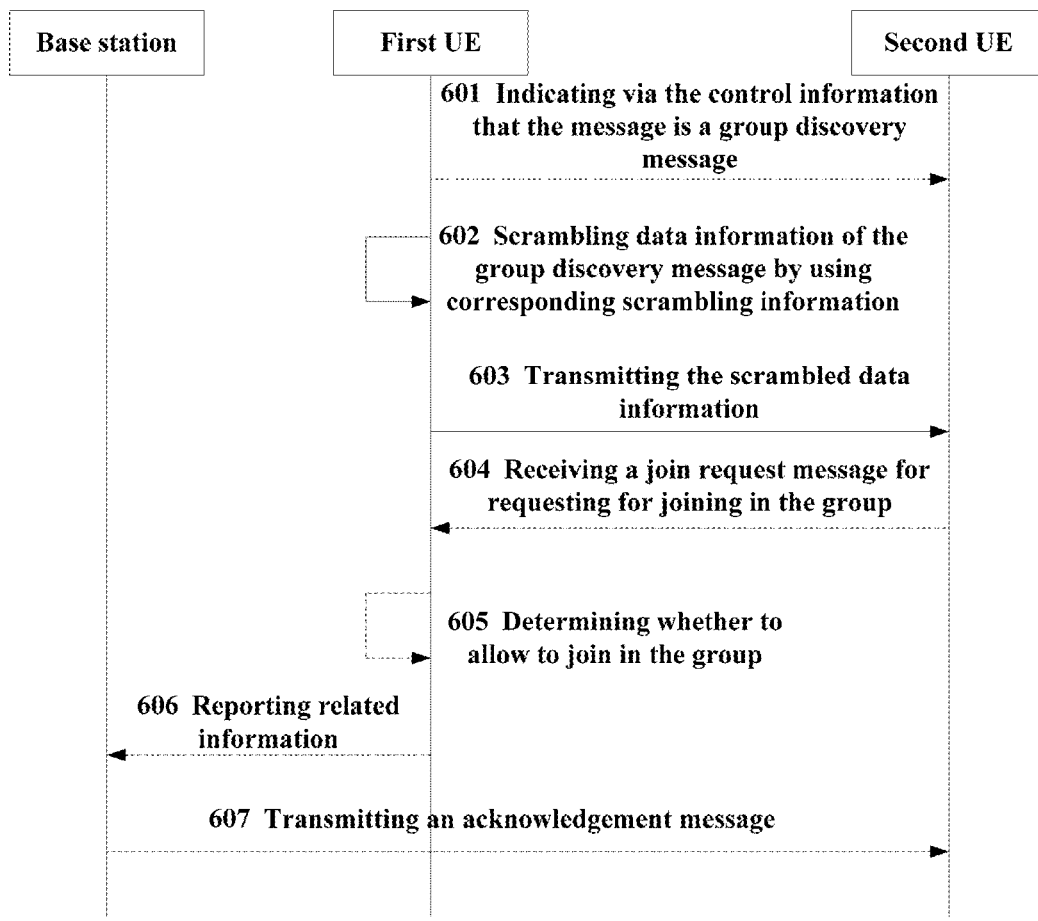
FIG. 6 is a flowchart of the group communication method of Embodiment 2 of this disclosure.

FIG. 6 is a flowchart of the group communication method of the embodiment of this disclosure. As shown in FIG. 6, the group communication method includes:

601: the first UE indicates to the second UE via the control information that the message is a group discovery message;

602: the first UE scrambles the data information of the group discovery message by using corresponding scrambling information.

In an embodiment, different message types and/or message transmission ranges correspond to different scrambling information; the scrambling information of the group discovery message may be an ID contained in the control information, or a scrambling sequence generated according to the ID;

603: the first UE transmits the scrambled data information to the second UE.

In an embodiment, the control information may be transmitted via the control channel or may be transmitted via a synchronization signal and/or a broadcast channel; and the data information may be transmitted via the data channel. And furthermore, the data information may also be transmitted via the discovery channel, at which moment, 601 may be omitted and the scrambling information may be a predetermined scrambling sequence. However, this disclosure is not limited thereto, and a particular transmission mode may be selected according to an actual situation.

For example, when a message is periodically transmitted by using one or more dedicated resources, the fleet discovery message may also be indicated by a synchronization signal and/or broadcast information. That is, the header may transmit the synchronization signal by using a synchronization sequence of a specific group, and the synchronization signal sequence may be mapped one by one with the fleet ID, and the data information of the fleet discovery message is indicated in the broadcast information (e.g. an MIB-SL, which is carried in a PSBCH), such as a period, a modulation and demodulation mode, a dedicated resource location, and a fleet ID, etc.

In an embodiment, taking that the group is a vehicle queue as an example, the header may periodically transmit the group discovery message, and the group discovery message may include one or more pieces of the following information:
the identification of the vehicle queue;
a type of vehicle queue;
a maximum number of vehicles or a queue length of the vehicle queue;
the number of vehicles in a current queue or a length of the queue;
the number of vehicles or a queue length that is allowed to join in the current queue;
a vehicle length and/or a vehicle width and/or a vehicle height that is/are allowed to join in the queue;
a driving velocity and/or a moving direction of the vehicle queue;
a lane where the vehicle queue is located; and
receiving timing of a join request message.

It is to be noted that the information on the group discovery message is only illustrated above; however, this disclosure is not limited thereto. For example, other information may also be used. And furthermore, the above information may be explicitly or implicitly contained in the data information, or may be explicitly or implicitly contained in the control information; multiple pieces of information may be combined for being indicated, and a particular implementation may be determined according to an actual situation.

As shown in FIG. 6, the group communication method may further include:

604: the first UE receives a join request message for requesting for joining in the group transmitted by the second UE.

In an embodiment, after receiving the control information transmitted by the first UE, the second UE may further receive the data information of the group discovery message. According to the data information, the second UE may determine whether to join in the group in which the first UE is located (hereinafter referred to as a first group), or determine whether a group in which the second UE is located (hereinafter referred to as the second group) joins in (or merges into) the first group.

In determining whether to allow joining, one or more of the following conditions may be employed:
whether moving directions of a source vehicle or a source vehicle queue and a target vehicle queue are consistent;
whether types of the source vehicle or source vehicle queue and the target vehicle queue match with each other; and
whether the source vehicle or source vehicle queue meets a limit of the target vehicle queue for the number of vehicles and/or vehicle sizes (including a length/a width/a height).

It is to be noted that whether to allow joining is only illustrated above. However, this disclosure is not limited thereto; for example, other determination conditions may also be used.

In an embodiment, the second UE may transmit the join request message to the first UE if it determines to join in the first group. A moment of transmission of the join request message may be determined, for example, according to the "receiving timing of a join request message" in the group discovery message; and the first UE may reserve a fixed time for receiving the join request message after the group discovery message is transmitted.

In an embodiment, taking that the group is a vehicle queue as an example, the join request message may include one or more pieces of the following information:
identification of the target vehicle queue;
identification of the source vehicle or identification of the source vehicle queue;
a type of the source vehicle or a type of source vehicle queue;
the number of vehicles in the source vehicle queue;
a vehicle length and/or a vehicle width and/or a vehicle height of the source vehicle;

a queue length and/or a queue width and/or a queue height of the source vehicle queue;

a lane where the source vehicle is located;

a lane where the source vehicle queue is located;

a velocity and/or a moving direction of the source vehicle; and a velocity and/or a moving direction of the source vehicle queue.

It is to be noted that the information on the join request message is only illustrated above; however, this disclosure is not limited thereto. For example, other information may also be used. And furthermore, the above information may be explicitly or implicitly contained in the data information, or may be explicitly or implicitly contained in the control information; multiple pieces of information may be combined for being indicated, and a particular implementation may be determined according to an actual situation.

As shown in FIG. 6, the group communication method may further include:

605: the first UE determines according to the join request message whether the second UE or the second group to which the second UE corresponds is allowed to join in the first group.

In an embodiment, 606 is executed if allowed, and the process may be terminated if not allowed.

In an embodiment, the first UE may periodically broadcast the group discovery message, and multiple second UEs may receive the group discovery message. And on the other hand, a certain second UE may receive group discovery messages transmitted by multiple first UEs, and then select a suitable first group.

As shown in FIG. 6, the group communication method may further include:

606: the first UE reports related information to the base station; and

607: the base station transmits an acknowledgement message to the second UE.

In an embodiment, if joining in the first group is allowed, the base station may transmit the acknowledgement message to the second UE, and transmit the group-specific sequence of the first group to the second UE.

In an embodiment, if joining in the first group is allowed, the first UE may also transmit an acknowledgement message allowing for joining to the second UE. And if joining in the first group is not allowed, the first UE may also transmit an acknowledgement message not allowing for joining to the second UE.

Figure 9:
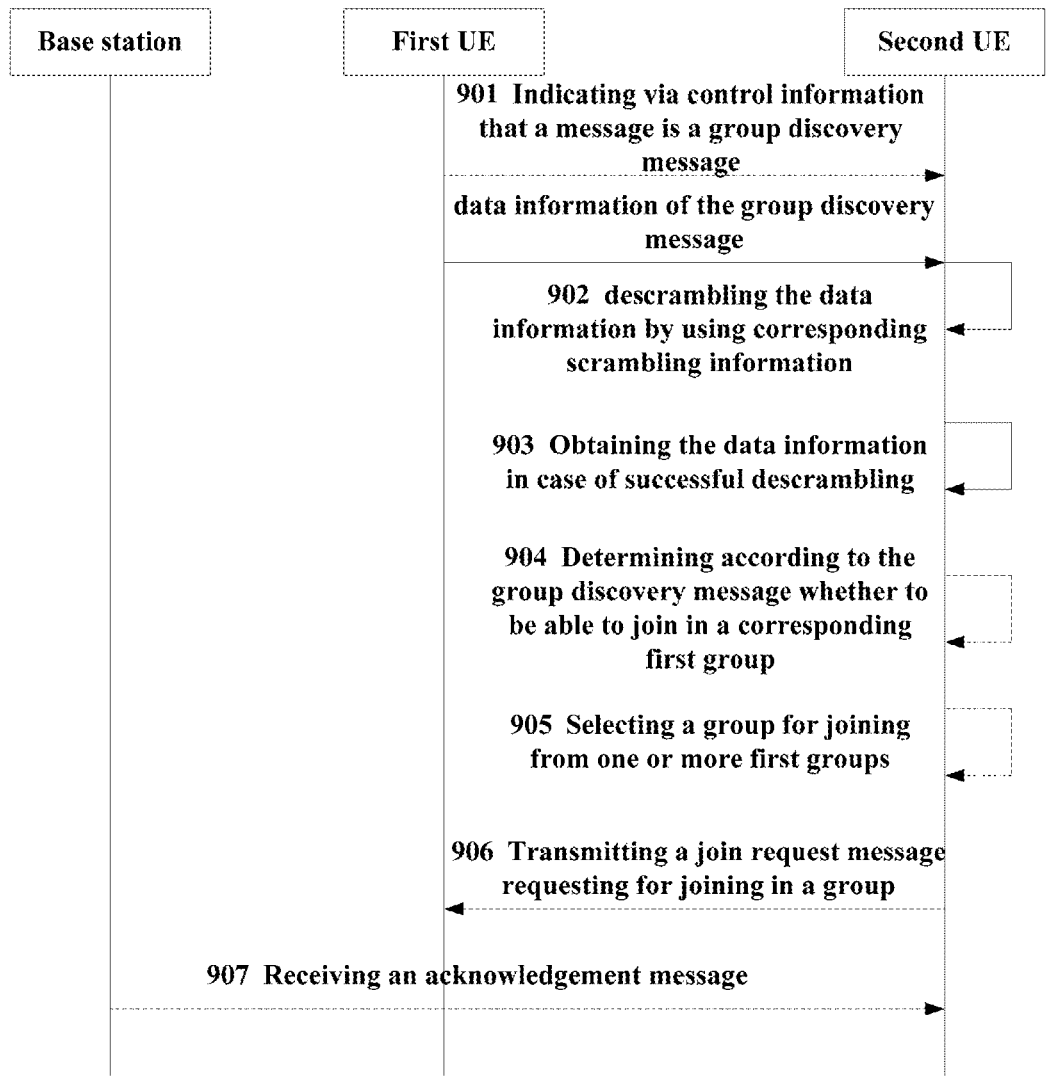
FIG. 9 is a flowchart of the group communication method of Embodiment 4 of this disclosure.

It should be noted that FIG. 6 only schematically shows related steps of the first UE; however, this disclosure is not limited thereto; and reference may be made to FIG. 9 for related steps of the second UE. FIG. 6 only schematically explains the embodiment of this disclosure. For example, an order of execution of the steps may be appropriately adjusted; and furthermore, some other steps may be added, or some of these steps may be reduced.

In an embodiment, after receiving the group-specific sequence, the second UE may receive the intra-group message and under intra-group management. For example, after receiving the fleet-specific scrambling sequence, it may receive the intra-fleet message, and the header may further manage and control the vehicle, such as adjusting the velocity of the vehicle, or a position of the vehicle, etc.

It can be seen from the above embodiments that the data information is scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

Embodiment 3

These embodiments of this disclosure provide a group communication method, which shall be described from a receiving device of a message, with contents identical to those in Embodiment 1 being not going to be described herein any further.

Figure 7:
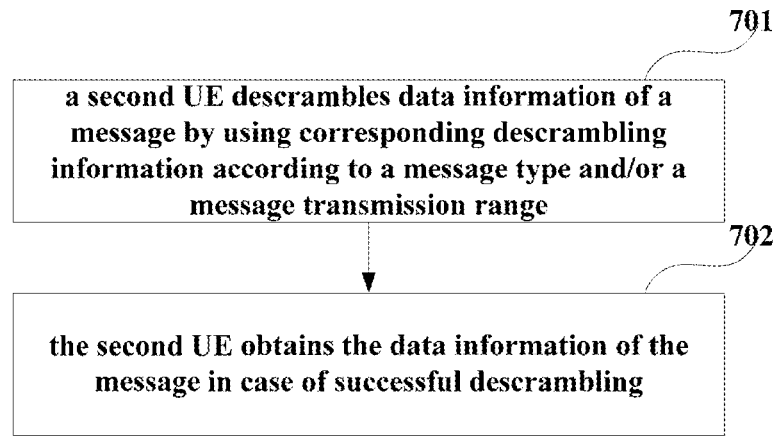
FIG. 7 is a flowchart of the group communication method of Embodiment 3 of this disclosure.

FIG. 7 is a flowchart of the group communication method of the embodiment of this disclosure. As shown in FIG. 7, the group communication method includes:

Block 701: a second UE descrambles data information of a message transmitted by a first UE, by using corresponding descrambling information according to a message type and/or a message transmission range; different message types and/or message transmission ranges correspond to different descrambling information; and Block 702: the second UE obtains the data information of the message in case of successful descrambling.

In an embodiment, the first UE is a transmitting device of a message, and the second UE is a receiving device of the message. The first UE and the second UE may be members of the same group, and the message is an intra-group message. Or, the first UE and the second UE may not be members of the same group, and the message may not be a non-intra-group message (such as an out-of-group message).

In an embodiment, the message may be an intra-group message or a non-intra-group message (such as an out-of-group message), and the data information of the message may be transmitted via a data channel. Alternatively, the message may also be a group discovery message, and the data information of the group discovery message may be transmitted via a discovery channel, such as a physical sidelink discovery channel (PSDCH).

Figure 8:
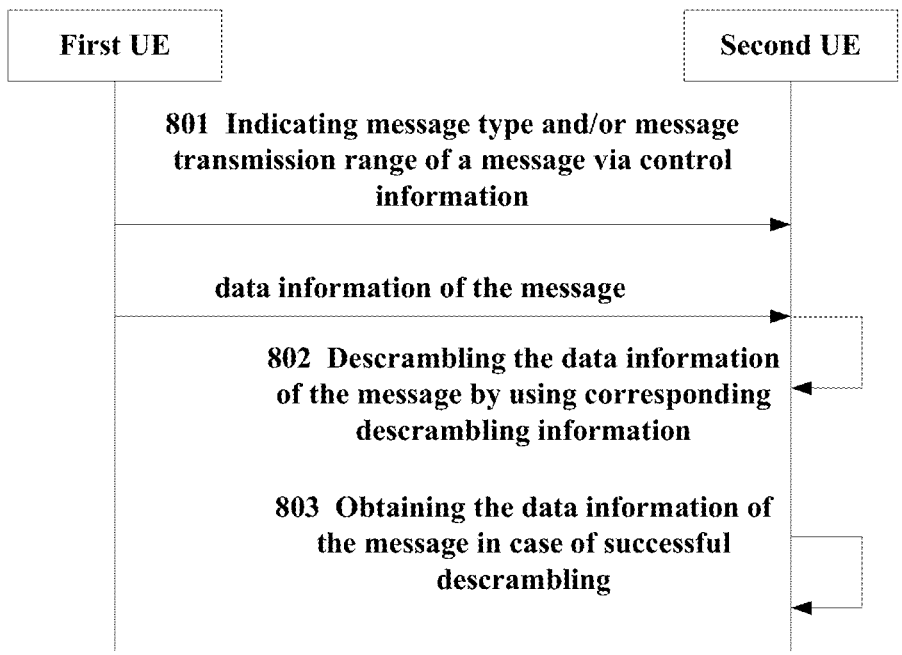
FIG. 8 is anther flowchart of the group communication method of Embodiment 3 of this disclosure.

FIG. 8 is another schematic diagram of the group communication method of the embodiment of this disclosure, in which a case where control information of a message is used is shown. As shown in FIG. 8, the group communication method may include:

801: the second UE receives the message type and/or the message transmission range transmitted by the first UE via control information;

802: the second UE descrambles data information of the message by using corresponding descrambling information according to the message type and/or the message transmission range; different message types and/or message transmission ranges correspond to different descrambling information;

803: the second UE obtains the data information of the message in case of successful descrambling.

In an embodiment, the control information may be transmitted via a control channel, or may be transmitted via a synchronization signal and/or a broadcast channel. The data information may be transmitted via a data channel, or may be transmitted via a discovery channel. However, this disclosure is not limited thereto, and a particular transmission mode may be selected according to an actual situation.

In an embodiment, the descrambling information may be identical to the scrambling information, or the descrambling information may be different from the scrambling information but there exists a correspondence therebetween, as long as an agreement is made between the transmitting device and the receiving device of the message.

In an embodiment, the message may be an intra-group message, and the second UE may descramble the data information by using the group-specific sequence. The group-specific sequence may be preconfigured by the base station for the second UE; for example, it may be transmitted to the second UE by the base station when the second UE joins in the group; however, this disclosure is not limited thereto.

In another embodiment, the message may be a non-intra-group message, and the second UE may descramble the data information by using the identification information contained in the control information, or may descramble the data information by using the descrambling information generated according to the identification information.

In a further embodiment, in a case where the message is a group discovery message, or in a case where the control information does not contain identification information, the second UE may descramble the data information by using a predetermined descrambling sequence, on which an agreement is made between the transmitting device and the receiving device.

In an embodiment, the control information may include one or more pieces of the following information: indication information indicating the message type, identification information of the group, and identification information of the UE; however, this disclosure is not limited thereto.

It can be seen from the above embodiments that the data information is scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

Embodiment 4

These embodiments of this disclosure further describe the group discovery message on the basis of Embodiment 3, with contents identical to those in embodiments 1-3 being not going to be described herein any further. In these embodiments, the first UE and the second UE are not UEs in the same group, that is, the second UE is a UE outside of the group where the first UE is located.

FIG. 9 is a flowchart of the group communication method of the embodiment of this disclosure. As shown in FIG. 9, the group communication method includes:

901: the first UE indicates to the second UE via the control information that the message is a group discovery message;

902: the second UE scrambles data information of the group discovery message by using corresponding scrambling information;

in an embodiment, different message types and/or message transmission ranges may correspond to different descrambling information; the descrambling information of the group discovery message may be an ID contained in the control information, or descrambling sequence generated according to the ID;

903: the second UE obtains the data information of the group discovery message in case of successful descrambling.

In an embodiment, the control information may be transmitted via the control channel or may be transmitted via a synchronization signal and/or a broadcast channel; and the data information may be transmitted via the data channel.

Furthermore, the data information may also be transmitted over the discovery channel, at which case, 901 may be omitted and the descrambling information may be a predetermined descrambling sequence. However, this disclosure is not limited thereto, and a particular transmission mode may be selected according to an actual situation.

As shown in FIG. 9, the group communication method may further include:

904: the second UE determines according to the group discovery message whether the second UE or a second group to which the second UE corresponds is able to join in a corresponding first group.

In an embodiment, taking that the group is a vehicle queue as an example, in determining whether to be able to join in, one or more of the following conditions may be employed:

whether moving directions of a source vehicle or a source vehicle queue and a target vehicle queue are consistent;

whether types of the source vehicle or source vehicle queue and the target vehicle queue match with each other; and whether the source vehicle or source vehicle queue meets a limit of the target vehicle queue for the number of vehicles and/or vehicle sizes (including a length/a width/a height).

It is to be noted that determination conditions of whether to determine to join in are only illustrated above. However, this disclosure is not limited thereto; for example, other determination conditions may also be used.

As shown in FIG. 9, the group communication method may further include:

905: the second UE selects a group for joining from one or more first groups.

In an embodiment, the second UE may receive a group discovery message, and if it is determined that it is able to join in, the first group to which the group discovery message corresponds is taken as the group for joining, at which case, 905 may be omitted. Furthermore, the second UE may receive multiple group discovery messages, and when it is determined in 904 that there exist multiple first groups for joining, following vehicle queues may be selected as the group for joining:

a vehicle queue of a maximum information received strength; or a vehicle queue of a minimum number of vehicles in current vehicle queues; or a vehicle queue of a shortest queue length in current vehicle queues; or a vehicle queue allowing most vehicles to be joined in; or a vehicle queue allowing a maximum length of queue to be joined in.

It is to be noted that determination conditions of selecting groups are only illustrated above. However, this disclosure is not limited thereto; for example, other determination conditions may also be used.

906: the second UE transmits a join request message requesting for joining in a group to the first UE.

In an embodiment, the second UE may transmit the join request message to a corresponding UE if it determines to join in the group. A moment of transmission of the join request message may be determined according to the "receiving timing of a join request message" in the group discovery message; and the first UE may reserve a fixed time for receiving the join request message after the group discovery message is transmitted.

As shown in FIG. 9, the group communication method may further include:

907: the second UE receives an acknowledgement message transmitted by a base station.

In an embodiment, if joining in the first group is allowed, the first UE may report related information to the base station, and the base station may transmit the acknowledgement message to the second UE, and transmit the group-specific sequence of the first group to the second UE.

In an embodiment, if joining in the first group is allowed, the first UE may also transmit an acknowledgement message allowing for joining to the second UE. And if joining in the first group is not allowed, the first UE may also transmit an acknowledgement message not allowing for joining to the second UE.

It should be noted that FIG. 9 only schematically shows related steps or blocks of the second UE; however, this disclosure is not limited thereto; and reference may be made to FIG. 6 for related steps or blocks of the first UE. FIG. 9 only schematically explains the embodiment of this disclosure. For example, an order of execution of the steps or blocks may be appropriately adjusted; and furthermore, some other steps or blocks may be added, or some of these steps or blocks may be reduced.

In an embodiment, after receiving the group-specific sequence, the second UE may receive the intra-group message and under intra-group management. For example, after receiving the fleet-specific scrambling sequence, it may be able to receive the intra-fleet message, and the header may further manage and control the vehicle, such as adjusting the velocity of the vehicle, or a position of the vehicle, etc.

It can be seen from the above embodiments that the data information is scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

Embodiment 5

These embodiments of this disclosure provide a group communication apparatus, configured in a first UE (a transmitting device of a message). These embodiments correspond to embodiments 1 and 2, with identical contents being not going to be described herein any further.

Figure 10:
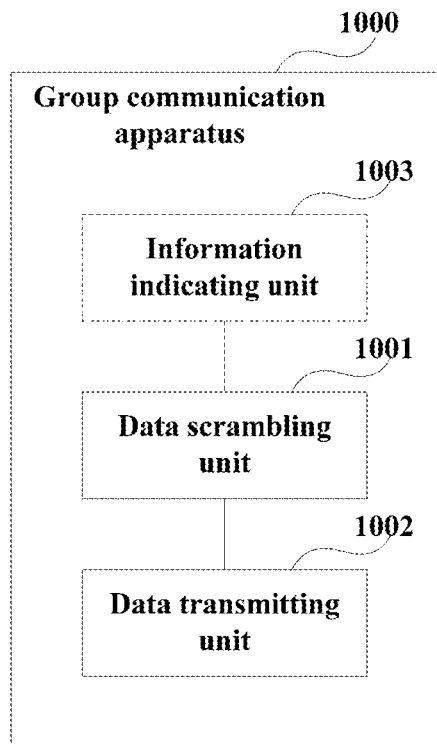
FIG. 10 is a schematic diagram of the group communication apparatus of Embodiment 5 of this disclosure.

FIG. 10 is a schematic diagram of the group communication apparatus of the embodiment of this disclosure. As shown in FIG. 10, the group communication apparatus 1000 includes:

a data scrambling unit 1001 configured to scramble data information of a message by using corresponding scrambling information according to a message type and/or a message transmission range; different message types and/or message transmission ranges correspond to different scrambling information; and a data transmitting unit 1002 configured to transmit the scrambled data information to a second UE.

In an embodiment, the message may be an intra-group message or a non-intra-group message (such as an out-of-group message), and the data information of the message may be transmitted via a data channel. Alternatively, the message may also be a group discovery message, and the data information of the group discovery message may be transmitted via a discovery channel, such as a physical sidelink discovery channel (PSDCH).

As shown in FIG. 10, the group communication apparatus 1000 may further include:

an information indicating unit 1003 configured to indicate the message type and/or the message transmission range to the second UE by using control information.

In an embodiment, the control information may be transmitted via a control channel, or may be transmitted via a synchronization signal and/or a broadcast channel, and the data information may be transmitted via a data channel or a discovery channel.

In an embodiment, the message is an intra-group message, and the data scrambling unit 1001 may scramble the data information by using a group-specific sequence.

In another embodiment, the message is an non-intra-group message, and the data scrambling unit 1001 may scramble the data information by using identification information contained in the control information, or may scramble the data information by using a scrambling sequence generated according to the identification information.

In a further embodiment, when the message is a group discovery message or when the control information contains no identification information, the data scrambling unit 1001 may scramble the data information by using a predetermined scrambling sequence, on which an agreement is made between the transmitting device and the receiving device.

In an embodiment, the group-specific sequence may be generated by the UE and reported to a base station, or may be generated or preconfigured by the base station for the group based on report information of the UE. And the group-specific sequence may be periodically updated, or may be updated when a UE joins in the group, or may be updated when a UE leaves the group.

In an embodiment, the control information may include one or more pieces of the following information: indication information indicating the message type, identification information of the group, and identification information of the UE. However, this embodiment is not limited thereto.

In an embodiment, the message may be a group discovery message, and the second UE may be a UE out of the group.

Figure 11:
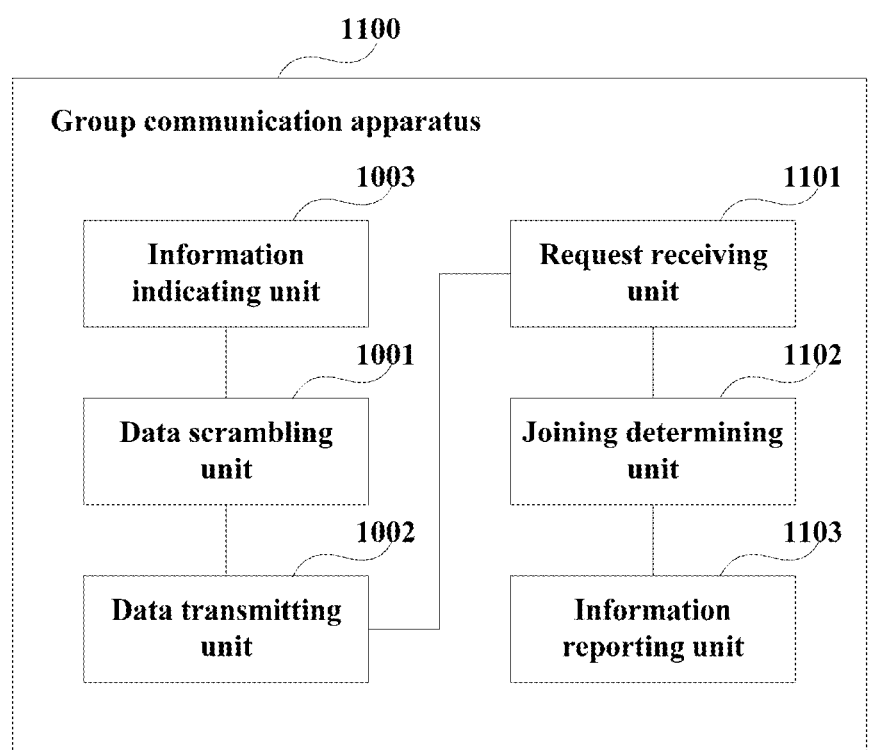
FIG. 11 is another schematic diagram of the group communication apparatus of Embodiment 5 of this disclosure.

FIG. 11 is another schematic diagram of the group communication apparatus of the embodiment of this disclosure. As shown in FIG. 11, the group communication apparatus 1100 includes an information indicating unit 1003, a data scrambling unit 1001 and a data transmitting unit 1002, as described above.

As shown in FIG. 11, the group communication apparatus 1100 may further include:

a request receiving unit 1101 configured to receive a join request message transmitted by the second UE requesting to join in a first group to which the group discovery message corresponds; and a joining determining unit 1102 configured to determine whether to allow the second UE or a second group to which the second UE corresponds to join in the first group according to the join request message.

As shown in FIG. 11, the group communication apparatus 1100 may further include:

an information reporting unit 1103 configured to report related information to a base station when the joining is allowed by the joining determining unit 1102, so that the base station is configured to transmit a group-specific sequence of the first group to the second UE.

Taking that the group is a vehicle queue as an example, the group discovery message may include one or more pieces of the following information:

the identification of the vehicle queue;

a type of vehicle queue;

a maximum number of vehicles or a queue length of the vehicle queue;

the number of vehicles in a current queue or a length of the queue;

the number of vehicles or a queue length that is allowed to join in the current queue;

a vehicle length and/or a vehicle width and/or a vehicle height that is/are allowed to join in the queue;

a driving velocity and/or a moving direction of the vehicle queue;

a lane where the vehicle queue is located; and receiving timing of a join request message.

It is to be noted that the information on the group discovery message is only illustrated above; however, this disclosure is not limited thereto. For example, other information may also be used. Furthermore, the above information may be explicitly or implicitly contained in the data information, or may be explicitly or implicitly contained in the control information; multiple pieces of information may be combined for being indicated, and a particular implementation may be determined according to an actual situation.

Taking that the group is a vehicle queue as an example, the data information of the join request message may include one or more pieces of the following information:

identification of the target vehicle queue;

identification of the source vehicle or identification of the source vehicle queue;

a type of the source vehicle or a type of source vehicle queue;

the number of vehicles in the source vehicle queue;

a vehicle length and/or a vehicle width and/or a vehicle height of the source vehicle;

a queue length and/or a queue width and/or a queue height of the source vehicle queue;

a lane where the source vehicle is located;

a lane where the source vehicle queue is located;

a velocity and/or a moving direction of the source vehicle; and a velocity and/or a moving direction of the source vehicle queue.

It is to be noted that the information on the join request message is only illustrated above; however, this disclosure is not limited thereto. For example, other information may also be used. Furthermore, the above information may be explicitly or implicitly contained in the data information, or may be explicitly or implicitly contained in the control information; multiple pieces of information may be combined for being indicated, and a particular implementation may be determined according to an actual situation.

Taking that the group is a vehicle queue as an example, in determining whether to allow for joining in by the joining determining unit 1102, one or more of the following conditions may be employed:

whether moving directions of a source vehicle or a source vehicle queue and a target vehicle queue are consistent;

whether types of the source vehicle or source vehicle queue and the target vehicle queue match with each other; and whether the source vehicle or source vehicle queue meets a limit of the target vehicle queue for the number of vehicles and/or vehicle sizes (including a length/a width/a height).

It is to be noted that determination conditions of whether to allow for joining in are only illustrated above. However, this disclosure is not limited thereto; for example, other determination conditions may also be used. Furthermore, some components related to this disclosure are only shown in FIGS. 10 and 11; however, this disclosure is not limited thereto. For example, other components of the group communication apparatus are not shown in FIGS. 10 and 11, and reference may be made to related techniques, which shall not be described herein any further.

It can be seen from the above embodiments that the data information is scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

Embodiment 6

These embodiments of this disclosure provide a group communication apparatus, configured in a second UE (a receiving device of a message). These embodiments correspond to embodiments 3 and 4, with identical contents being not going to be described herein any further.

Figure 12:
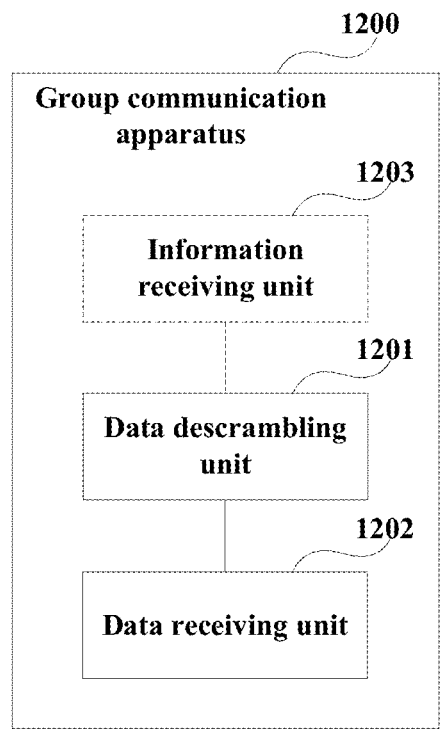
FIG. 12 is a schematic diagram of the group communication apparatus of Embodiment 6 of this disclosure.

FIG. 12 is a schematic diagram of the group communication apparatus of the embodiment of this disclosure. As shown in FIG. 12, the group communication apparatus 1200 includes:

a data descrambling unit 1201 configured to descramble data information of a message transmitted by a first UE by using corresponding descrambling information according to a message type and/or a message transmission range; different message types and/or message transmission ranges correspond to different descrambling information; and a data receiving unit 1202 configured to obtain the data information of the message in case of successful descrambling.

As shown in FIG. 12, the group communication apparatus 1200 may further include:

an information receiving unit 1203 configured to receive the message type and/or the message transmission range transmitted by the first UE by using control information.

In one embodiment, the message is an intra-group message, and the data descrambling unit 1201 may descramble the data information by using a group-specific sequence.

In another embodiment, the message is an non-intra-group message, and the data descrambling unit 1201 may descramble the data information by using identification information contained in the control information or a descrambling sequence generated according to the identification information.

In a further embodiment, when the message is a group discovery message or when the control information contains no identification information, the data descrambling unit 1201 may further descramble the data information by using a predetermined descrambling sequence, on which an agreement may be made by the transmitting device and the receiving device.

In an embodiment, the control information may include one or more pieces of the following information: indication information indicating the message type, identification information of the group, and identification information of the UE. However, this embodiment is not limited thereto.

In an embodiment, the message may be a group discovery message, and the second UE may be a UE out of the group.

Figure 13:
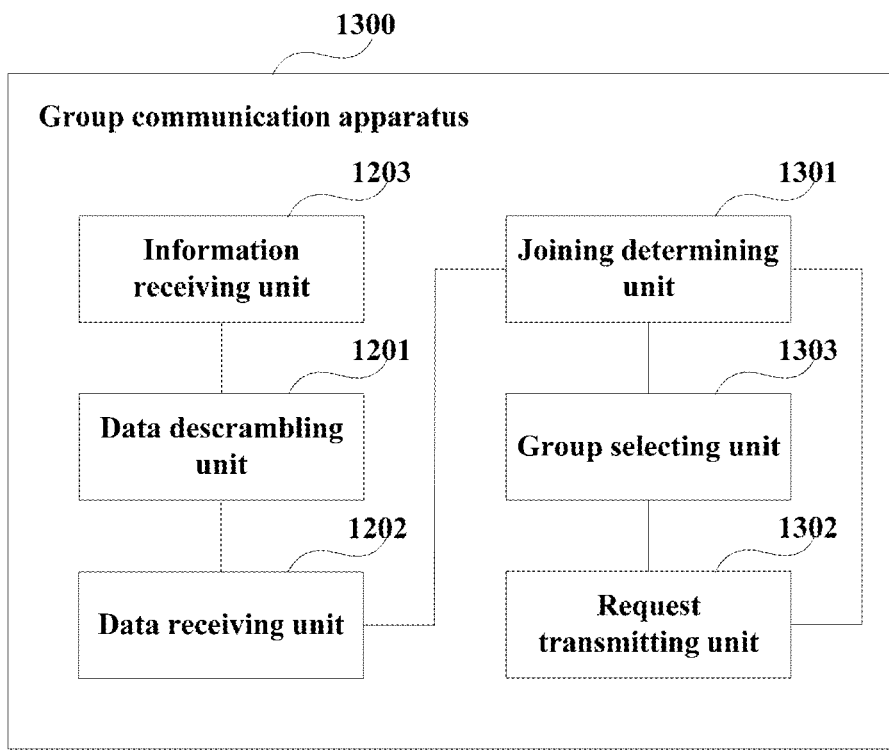
FIG. 13 is another schematic diagram of the group communication apparatus of Embodiment 6 of this disclosure.

FIG. 13 is another schematic diagram of the group communication apparatus of the embodiment of this disclosure. As shown in FIG. 13, the group communication apparatus 1300 includes an information receiving unit 1203, a data descrambling unit 1201 and a data receiving unit 1202, as described above.

As shown in FIG. 13, the group communication apparatus 1300 may further include:

a joining determining unit 1301 configured to determine whether the second UE or a second group to which the second UE corresponds is capable of joining in a first group to which the group discovery message corresponds according to the group discovery message; and a request transmitting unit 1302 configured to transmit a join request message for requesting to join in the first group to the UE transmitting the group discovery message.

Taking that the group is a vehicle queue as an example, in determining whether to join in by the joining determining unit 1301, one or more of the following conditions may be employed:

whether moving directions of a source vehicle or a source vehicle queue and a target vehicle queue are consistent;

whether types of the source vehicle or source vehicle queue and the target vehicle queue match with each other; and whether the source vehicle or source vehicle queue meets a limit of the target vehicle queue for the number of vehicles and/or vehicle sizes.

As shown in FIG. 13, the group communication apparatus 1300 may further include: a group selecting unit 1303 configured to select a group for joining from one or more first groups that is allowed for joining.

Taking that the group is a vehicle queue as an example, the group for joining may be: a vehicle queue of a maximum information received strength; or a vehicle queue of a minimum number of vehicles in current vehicle queues; or a vehicle queue of a shortest queue length in current vehicle queues; or a vehicle queue allowing most vehicles to be joined in; or a vehicle queue allowing a maximum length of queue to be joined in. however, this disclosure is not limited thereto.

It is to be noted that some components related to this disclosure are only shown in FIGS. 12 and 13; however, this disclosure is not limited thereto. For example, other components of the group communication apparatus are not shown in FIGS. 12 and 13, and reference may be made to related techniques, which shall not be described herein any further.

It can be seen from the above embodiments that the data information is scrambled by using different scrambling information varying along with different message types and/or message transmission ranges. Hence, internal members or peripheral devices of a group may selectively receive messages of different types or different target ranges. Hence, not only messages may be ensured to be accurately received by corresponding receivers, but also security of internal message may be improved.

Embodiment 7

These embodiments of this disclosure provide a communication system, with contents identical to those in embodiments 1-6 being not going to be described herein any further.

Figure 14:
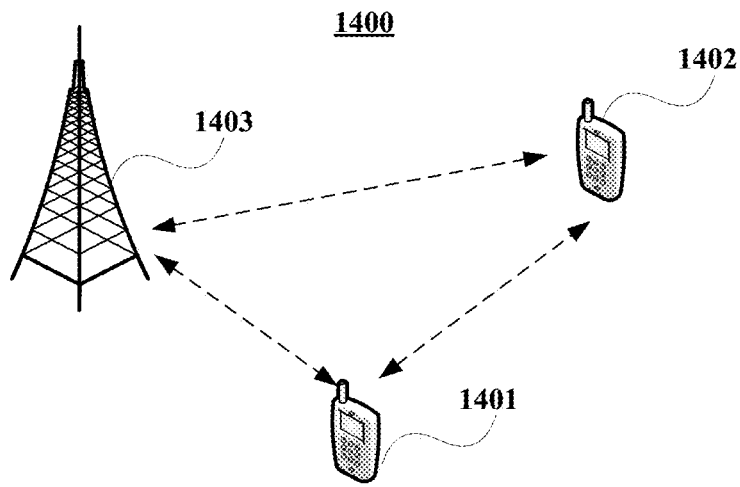
FIG. 14 is a schematic diagram of the communication system of Embodiment 7 of this disclosure.

FIG. 14 is a schematic diagram of the communication system of the embodiment of this disclosure, in which a case where a transmitting device is a first UE and a receiving device is a second UE is illustrated. As shown in FIG. 14, the communication system 1400 may include a first UE 1401 and a second UE 1402.

The first UE 1401 is configured with the group communication apparatus 1000 or 1100 described in Embodiment 5, and the second UE 1402 is configured with the group communication apparatus 1200 or 1300 described in Embodiment 6.

As shown in FIG. 14, the communication system 1400 may further include:

a base station 1403 configured to provide communication services for the first UE 1401 and/or the second UE 1402.

The embodiment of this disclosure further provides a UE, which may be the first UE 1401 or the second UE 1402.

Figure 15:
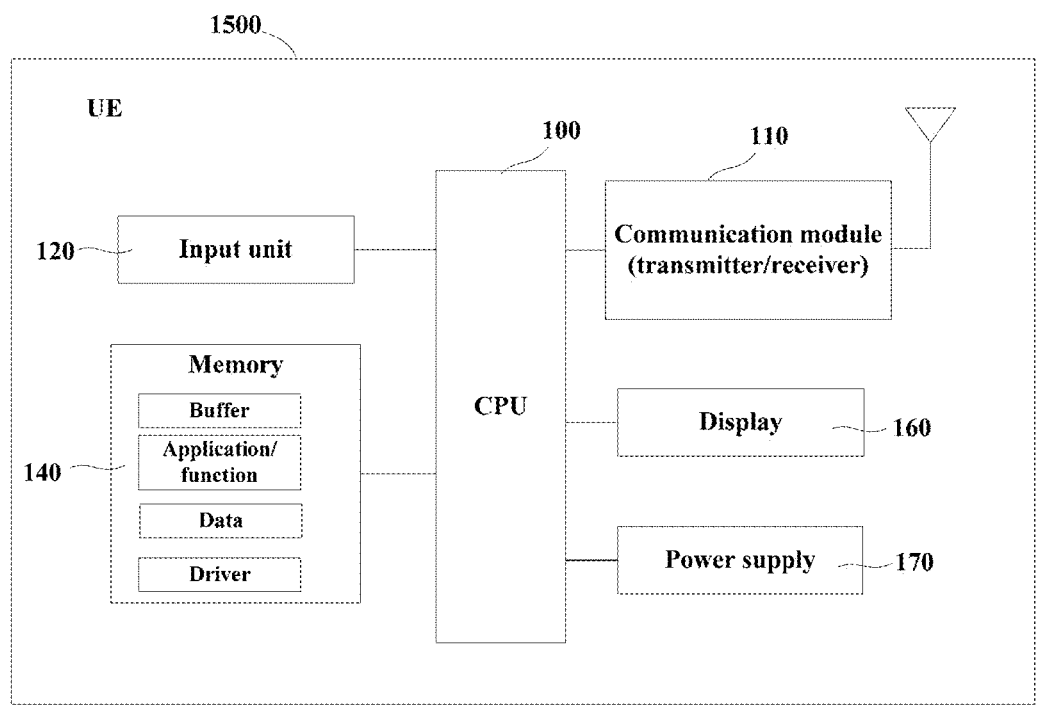
FIG. 15 is a schematic diagram of the user equipment of Embodiment 7 of this disclosure.

FIG. 15 is a schematic diagram of the UE of the embodiment of this disclosure. As shown in FIG. 15, the UE 1500 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In one embodiment, the UE 1500 may be taken as a transmitting device of a message, and functions of the group communication apparatus 1000 or 1100 may be integrated into the central processing unit 100. The central processing unit 100 may be configured to carry out the group communication method described in Embodiment 1 or 2.

For example, the central processing unit 100 may be configured to perform following control: scrambling data information of a message by using corresponding scrambling information according to a message type and/or a message transmission range; different message types and/or message transmission ranges correspond to different scrambling information; and transmitting the scrambled data information.

In another embodiment, the UE 1500 may be taken as a receiving device of a message, and functions of the group communication apparatus 1200 or 1300 may be integrated into the central processing unit 100. The central processing unit 100 may be configured to carry out the group communication method described in Embodiment 3 or 4.

For example, the central processing unit 100 may be configured to perform following control: descrambling data information of a message transmitted by a first UE by using corresponding descrambling information according to a message type and/or a message transmission range; different message types and/or message transmission ranges correspond to different descrambling information; and obtaining the data information of the message in case of successful descrambling.

As shown in FIG. 15, the UE 1500 may further include a communication module 110, an input unit 120, a display 160 and a power supply 170. Functions of the above components are similar to those in the relevant art, and shall not be described herein any further. It should be noted that the UE 1500 does not necessarily include all the parts shown in FIG. 15, and the above components are not necessary; and furthermore, the UE 1500 may include parts not shown in FIG. 15, and the relevant art may be referred to.

An embodiment of the present disclosure provides a computer readable program code, which, when executed in a group communication apparatus or a UE, will cause the group communication apparatus or the UE to carry out the group communication methods described in embodiments 1-4.

An embodiment of the present disclosure provides a computer readable medium, including a computer readable program code, which will cause a group communication apparatus or a UE to carry out the group communication methods described in embodiments 1-4.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 10 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A first user equipment (UE), comprising:
a memory that stores a plurality of instructions; and
a processor coupled to the memory and configured to execute the instructions to transmit control information to a second UE, wherein the control information comprises: indication information explicitly indicating whether a message is an intra-group message or a non-intra-group message, and one of identification information of the group and identification information of the first UE;
to scramble data information of the message by using scrambling information according to whether the message is the intra-group message or the non-intra-group message, the scrambling information is the identification information contained in the control information, or is a scrambling sequence generated according to the identification information contained in the control information, when the indication information contained in the control information indicating the message is the non-intra-group message and the scrambling information is a group-specific sequence when the indication information contained in the control information indicating the message is the intra-group message; and
to transmit the scrambled data information to a second UE.

2. The first user equipment according to claim 1, wherein the control information is transmitted via a control channel, or is transmitted via a synchronization signal and/or a broadcast channel.

3. The first user equipment according to claim 1, wherein the data information is transmitted via a data channel or a discovery channel.

4. The first user equipment according to claim 1, wherein the scrambling information is a predetermined scrambling sequence, when the non-intra-group message is a group discovery message or when the control information contains no identification information.

5. The first user equipment according to claim 1, wherein the group-specific sequence is generated by the first UE and reported to a base station, or is generated or preconfigured by the base station for the group based on report information of the first UE.

6. The first user equipment according to claim 1, wherein the non-intra-group message is a group discovery message, the second UE is a UE out of the group, and the processor is further configured to execute the instructions
to receive a join request message, which is transmitted by the second UE and requests to join in a first group to which the group discovery message corresponds; and
to determine whether to allow the second UE or a second group to which the second UE corresponds to join in the first group, according to the join request message.

7. The first user equipment according to claim 6, wherein the processor is further configured to execute the instructions to report related information to a base station when the joining is allowed, to enable the base station to transmit a group-specific sequence of the first group to the second UE.

8. A second user equipment (UE), comprising:
a memory that stores a plurality of instructions; and
a processor coupled to the memory and configured to execute the instructions
to receive control information transmitted by a first UE, wherein the control information comprises: indication information explicitly indicating whether a message is an intra-group message or a non-intra-group message, and one of identification information of the group and identification information of the first UE;
to descramble data information of the message transmitted by the first UE by using descrambling information according to whether the message is the intra-group message or the non-intra-group message, the descrambling information is the identification information contained in the control information, or is a descrambling sequence generated according to the identification information contained in the control information, when the indication information contained in the control information indicating the message is the non-intra-group message and the descrambling information is a group-specific sequence when the indication information contained in the control information indicating the message is the intra-group message; and to obtain the data information of the message in case of successful descrambling.

9. The second user equipment according to claim 8, wherein the descrambling information is a predetermined descrambling sequence, when the non-intra-group message is a group discovery message or when the control information contains no identification information.

10. The second user equipment according to claim 8, wherein the non-intra-group message is a group discovery message, the second UE is a UE out of the group, and the processor is further configured to execute the instructions to determine whether the second UE or a second group to which the second UE corresponds is capable of joining in a first group to which the group discovery message corresponds according to the group discovery message; and to transmit a join request message for requesting to join in the first group to the UE that is transmitting the group discovery message.

11. The second user equipment according to claim 10, wherein the processor is further configured to execute the instructions to select a group for joining from one or more first groups that is allowed for joining.

12. A communication system, comprising:
a first user equipment (UE) configured to transmit control information to a second UE, wherein the control information comprises: indication information explicitly indicating whether the message is an intra-group message or a non-intra-group message, and one of identification information of the group and identification information of the first UE, and to scramble data information of the message by using scrambling information according to whether the message is the intra-group message or the non-intra-group message, and transmit the scrambled data information, the scrambling information is the identification information contained in the control information, or is a scrambling sequence generated according to the identification information contained in the control information, when the indication information contained in the control information indicating the message is the non-intra-group message and the scrambling information is a group-specific sequence when the indication information contained in the control information indicating the message is the intra-group message; and the second UE configured to descramble data information of the message transmitted by the first UE by using descrambling information according to whether the message is the intra-group message or the non-intra-group message, and obtain the data information of the message in case of successful descrambling.

13. The communication system according to claim 12, wherein the communication system further comprises:
a base station configured to provide communication services to the first UE and/or the second UE;
wherein the scrambling information is a scrambling sequence or a scrambling ID, and/or, the descrambling information is a descrambling sequence or a descrambling ID.

* * * * *